UNITED STATES PATENT OFFICE.

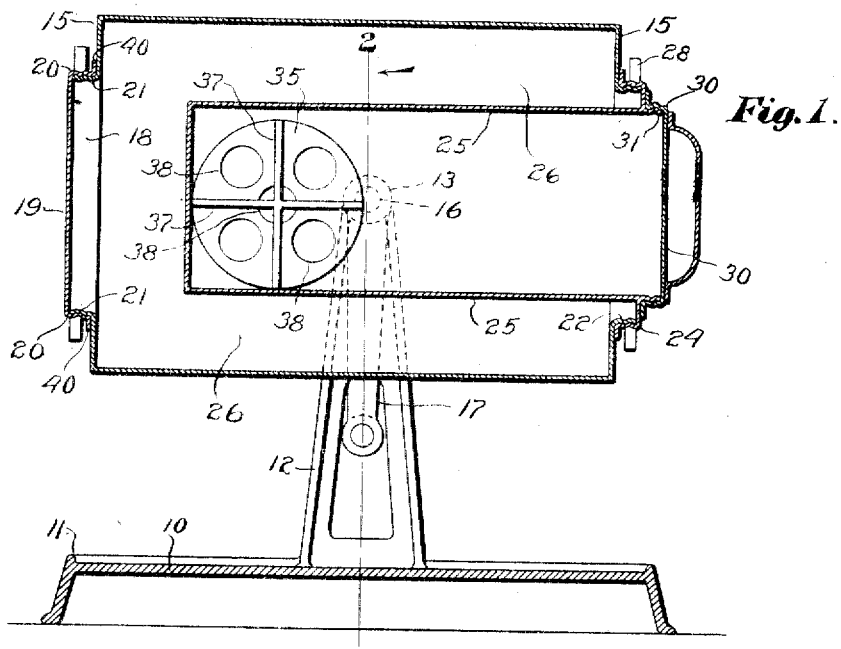
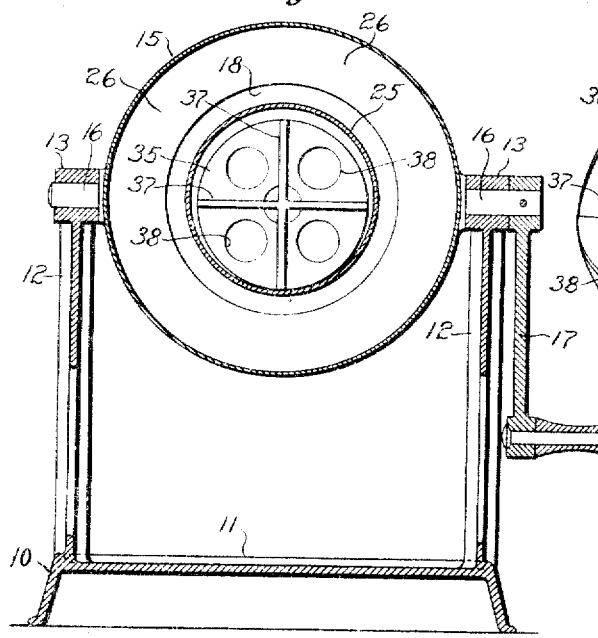
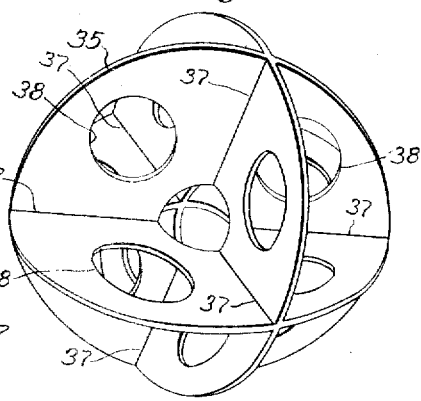

HENRY P. ROBERTS, OF ROXBURY, MASSACHUSETTS.

APPARATUS FOR FREEZING LIQUIDS.

1,204,317.

Specification of Letters Patent. Patented Nov. 7, 1916.

Application filed December 8, 1914. Serial No. 876,082.

*To all whom it may concern:*

Be it known that I, HENRY P. ROBERTS, a citizen of the United States, and a resident of Roxbury, county of Suffolk, State of Massachusetts, have invented an Improvement in Apparatus for Freezing Liquids, of which the following description, in connection with the accompanying drawing, is a specification, like characters on the drawing representing like parts.

This invention relates to apparatus for freezing liquids and pertains more particularly to freezers for making ice cream and the like.

In the accompanying drawing and the herein description of the invention I disclose but a single embodiment herein in which, Figure 1, is a central vertical section through the longitudinal axis of said embodiment. Fig. 2 is a central vertical section on line 2—2 of Fig. 1. Fig. 3 is a perspective view of an agitator for the chilling receptacle.

The terms employed herein are used in the generic and descriptive sense to disclose the aforesaid single embodiment and therefore are not primarily words of limitation of this invention.

In the drawing 10 represents a base provided with a trough like portion 11 and a pair of standards 12 having at the top thereof bearings 13. Between said standards I preferably provide a container 15 having shafts 16 adapted to rotate in the aforesaid bearings 13. One of said shafts is provided with a crank 17 or any other suitable means for imparting rotary swinging or oscillatory motions to the container 15. For convenience the said container may be provided with an orifice 18 normally closed by the cover 19 screwed or otherwise fastened to the body of the container. Herein for example, the said cover and container are provided with screw threaded portions 20 and 21 respectively permitting the removal of said cover for the purpose hereinafter set forth. Another portion of the said container 15 is provided with a screw threaded flange 22 and engages a similarly screw threaded flange 24 on one end of a receptacle 25 adapted to receive therein the liquid to be chilled or frozen and when in operative position is surrounded by the said container 15. As herein shown the said container 15 and the receptacle 25 are cylindrical and when the two are in operative relation the former surrounds the latter with an intervening space 26. That is the said container is of larger diameter than the receptacle and the latter projects within the former thereby providing a closed chamber within which is placed the freezing or chilling agent.

A pair of lugs 28 project from the flange 24 to enable the operator to more firmly grasp the said flange for the purpose of rotating it and the receptacle so that the receptacle may be withdrawn from the interior of this container 15. The said flange when screwed to the container 15 holds the receptacle 25 in operative position within the former. A flanged cover 30 is screw threaded at 31 to the end of the receptacle 25 to prevent leakage of the liquid from the receptacle when the latter is being rotated or otherwise moved.

Within the receptacle I provide an agitator or plunger 35 separate from and entirely independent of any of the parts herein described. This plunger 35 may be of any desired or preferred form or configuration most suitable for the purposes of a plunger to reciprocate relative to the receptacle and to be located therein. Herein for example, I have illustrated the said plunger as consisting of three intersecting disk like pieces of relatively thin metal and having their junctions along their intersecting diameters 37 at the three points ninety degrees one from the other. This ribbed construction or similar construction therefore presents circular rolling and scraping edges adapted to agitate the liquid to be frozen and to remove the accumulations of the liquid frozen to the interior surface of the receptacle 25. The sectors formed by the intersecting disks or ribs are provided with holes which assist the process of agitation of the liquid as the said plunger by its combined sliding and rolling motions moves from end to end of said receptacle.

Having described the structure of the present embodiment of my invention the operation thereof is as follows: The cover 19 is removed from the container and ice and salt or any other suitable chilling agent is packed in the space 26 about the receptacle 25 until said space is fairly but not completely filled after which the said cover is screwed back in place until the flange 40 snugly engages the container. The container is then rotated so that the cover 30 is uppermost. The cover 30 is removed from said container 15 and the cream or other liquid to be frozen is poured therein and the said cover is replaced. It is assumed that the plunger 35 was in the receptacle before the said cream was introduced therein. The several parts are now in operative relation, and the liquid to be frozen and the freezing agent are in their respective places. The operator then grasps the crank 17 and turning the same in the usual manner rotates both the container 15 and the receptacle 25. During this rotary motion the freezing agent is presented successively to different surfaces of the receptacle thereby agitating said agent as the container rotates. The cream or other liquid is flowed from end to end of the receptacle as the same is rotated by the action of the container. During this rotary movement and depending upon the consistency of the mass the plunger 35 moves with a rotary, whirling or sliding and scraping action from end to end of the interior of the receptacle, agitating the cream, scraping off the chilled deposits of cream along the interior of the receptacle and commingles said deposit with the mass of the liquid. A fresh deposit follows and is in turn scraped off when next the end of the receptacle 25 moves up carrying with it said plunger 35 and the return movement of the plunger 35 takes place. In this manner the chilled liquid about the sides of the receptacle is commingled with the body of the liquid as rapidly as chilled. Therefore the liquid is chilled or frozen much sooner than is the case when the liquid is rotated about the axis of the liquid chambers of such devices disclosed by the present art. The resulting product is much finer in structure than where larger crystals are allowed to accumulate as in the case of the present rotary agitator freezers.

My invention embodies an agitator or plunger actuated by the movement of the receptacle and as distinguished from a device where driving mechanism connects directly with the said plunger and is acted upon by such means independently of the receptacle.

It will be noticed that in addition to the features heretofore set forth that there is no opportunity for foreign matter to enter from the container to the receptacle or from other sources to said receptacle.

When the cream is frozen, which is in from three to five minutes after the introduction of the cream, the flanged cover 30 may be removed without disturbing the apparatus at any other point.

The receptacle is plain, without shoulders or ledges of any sort for the lodgment of foreign matter and it is a most simple operation to thoroughly cleanse the same. The cover 19 is so arranged that when it is removed from the container 15 the freezing agent may be withdrawn from the container without disturbing the receptacle. The trough like portions 11 are so arranged that any condensation forming exteriorly of the container or liquids leaking therefrom will be retained on the base 10.

I have described herein one embodiment of my invention; but it is to be understood that the latter is not essentially limited to the specific details of construction and organization of said embodiment, since the same may be varied without departing from the proper scope of the claims.

Claims:

1. In an apparatus of the character described, in combination, a closed receptacle, means to move said receptacle, and a plunger comprising a plurality of rib members within a spherical boundary in said receptacle operated by the movement of the receptacle and detached therefrom.

2. In an apparatus of the character described, in combination, a receptacle, mechanism for agitating said receptacle, a plunger comprising a plurality of intersecting ribs within said receptacle and detached therefrom, said plunger being operated by the agitation of said receptacle.

3. In an apparatus of the character described, in combination, a receptacle, a container inclosing said receptacle and forming therewith a chamber for the reception of a freezing agent, mechanism for agitating said receptacle and said container, a detached foraminous plunger having scraping ribs within a spherical boundary and rotatable within said receptacle adapted to be operated by the agitation of said receptacle.

In testimony whereof, I have signed my name to this specification, in the presence of two subscribing witnesses.

HENRY P. ROBERTS.

Witnesses.
MAUD E. ORGAN,
ARTHUR F. RANDALL.